Patented Jan. 12, 1954

2,666,075

UNITED STATES PATENT OFFICE 2,666,075

PROCESS FOR THE PRODUCTION OF THE DIZINC SALT OF HYDROXYMETHANE SULFINIC ACID

Alfons Janson, Ludwigshafen (Rhine-Oppau), Germany, assignor to Badische Anilin- & Soda-Fabrik Aktiengesellschaft, Ludwigshafen (Rhine), Germany No Drawing. Application November 7, 1951, Serial No. 255,320

Claims priority, application Germany November 11, 1950

7 Claims. (Cl. 260—429)

This invention relates to a process for the production of the dizinc salt of hydroxymethane sulfinic acid.

The difficultly water-soluble dizinc salt of hydroxymethane sulfinic acid, which is an important dye assistant, has hitherto been prepared by reduction of zinc formaldehyde-bisulfite with zinc dust. Since by this method it is only possible to obtain a crude product contaminated by zinc oxide, impurities originally contained in the zinc dust and other contaminants, a purification must be carried out by dissolution in acids, filtration and reprecipitation of the dizinc salt with bases. The zinc salt present in the filtrate is converted into zinc oxide and after reaction with sulfur dioxide and formaldehyde is used again as initial material. Since the reduction with zinc dust proceeds very slowly, it is necessary to work with an excess of reducing agent and at the boiling temperature.

I have now found, that the pure dizinc salt of hydroxymethane sulfinic acid can be obtained in a more simple manner by reacting the sodium salt of the said acid, $Na(HSO_2 \cdot CH_2O)$, with the equivalent amount of a zinc salt preferably an inorganic zinc salt and precipitating the dizinc salt of hydroxymethane sulfinic acid by bases preferably by an inorganic base, e. g. an alkali metal hydroxide, according to the equation:

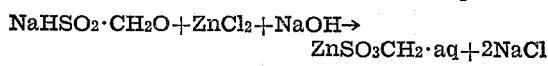
$$NaHSO_2 \cdot CH_2O + ZnCl_2 + NaOH \rightarrow ZnSO_3CH_2 \cdot aq + 2NaCl$$

whilst the temperature is being kept low by cooling, preferably below 30° C. The addition of the bases should be carried out slowly and with vigorous stirring so that no zinc oxide, which would react only very slowly, is precipitated. By filtration, washing out and drying in vacuo, the dizinc salt is obtained in good yields and in a high state of purity.

The process according to this invention is of special importance when the sodium salt of hydroxymethane sulfinic acid is obtained independently of the above-described zinc dust process by the catalytic reduction of sodium formaldehyde bisulfite, $Na(HSO_3 \cdot CH_2O)$ or by the reaction of sodium hyposulfite, $Na_2S_2O_4$, which can be obtained for example by electrolytic method with the aid of sodium amalgam from bisulfites, with formaldehyde and sodium hydroxide.

The following example will further illustrate this invention but the invention is not limited to this example.

Example 137 parts of zinc chloride are added to 300 parts of an aqueous solution of 154 parts of the sodium salt of hydroxymethane sulfinic acid and the solution is stirred vigorously while 100 parts of an aqueous sodium hydroxide solution (40% strength) are slowly added. The temperature is kept below 30° C. by cooling. After stirring for one hour, the crystal mass is filtered off from the liquid, washed with a little water and then with alcohol and dried in vacuo. 177 parts of a salt are obtained which consists to the extent of 80% of the dizinc salt of hydroxymethane sulfinic acid; this represents a yield of 89%.

What I claim is:

1. A process for the production of the dizinc salt of hydroxymethane sulfinic acid which comprises reacting the sodium salt of hydroxymethane sulfinic acid in aqueous solution with the equivalent amounts of a zinc salt and a base and separating the dizinc salt of hydroxymethane sulfinic acid thus formed.

2. A process for the production of the dizinc salt of hydroxymethane sulfinic acid which comprises reacting the sodium salt of hydroxymethane sulfinic acid in aqueous solution with the equivalent amounts of a zinc salt and a base and at a temperature ranging from room temperature to 30° C. and separating the dizinc salt of hydroxymethane sulfinic acid thus formed.

3. A process for the production of the dizinc salt of hydroxymethane sulfinic acid which comprises reacting the sodium salt of hydroxymethane sulfinic acid in aqueous solution with the equivalent amounts of an inorganic zinc salt and a base and at a temperature ranging from room temperature to 30° C. and separating the dizinc salt of hydroxymethane sulfinic acid thus formed.

4. A process for the production of the dizinc salt of hydroxymethane sulfinic acid which comprises reacting the sodium salt of hydroxymethane sulfinic acid in aqueous solution with the equivalent amounts of an inorganic zinc salt and an inorganic base and at a temperature ranging from room temperature to 30° C. and separating the dizinc salt of hydroxymethane sulfinic acid thus formed.

5. A process for the production of the dizinc salt of hydroxymethane sulfinic acid which comprises reacting the sodium salt of hydroxymethane sulfinic acid in aqueous solution with the equivalent amounts of an inorganic zinc salt and an alkali metal hydroxide and at a temperature ranging from room temperature to 30° C. and separating the dizinc salt of hydroxymethane sulfinic acid thus formed.

6. A process for the production of the dizinc salt of hydroxymethane sulfinic acid which comprises reacting the sodium salt of hydroxymethane sulfinic acid in aqueous solution with the equivalent amounts of zinc chloride and an alkali metal hydroxide and at a temperature ranging from room temperature to 30° C. and separating the dizinc salt of hydroxymethane sulfinic acid thus formed.

7. A process for the production of the dizinc salt of hydroxymethane sulfinic acid which comprises reacting the sodium salt of hydroxymethane sulfinic acid in aqueous solution with the equivalent amounts of zinc chloride and sodium hydroxide and at a temperature ranging from room temperature to 30° C. and separating the dizinc salt of hydroxymethane sulfinic acid thus formed.

ALFONS JANSON.

References Cited in the file of this patent

UNITED STATES PATENTS

| Number | Name | Date |
|---|---|---|
| 2,223,886 | Dowing | Dec. 3, 1940 |